Patented Jan. 21, 1936

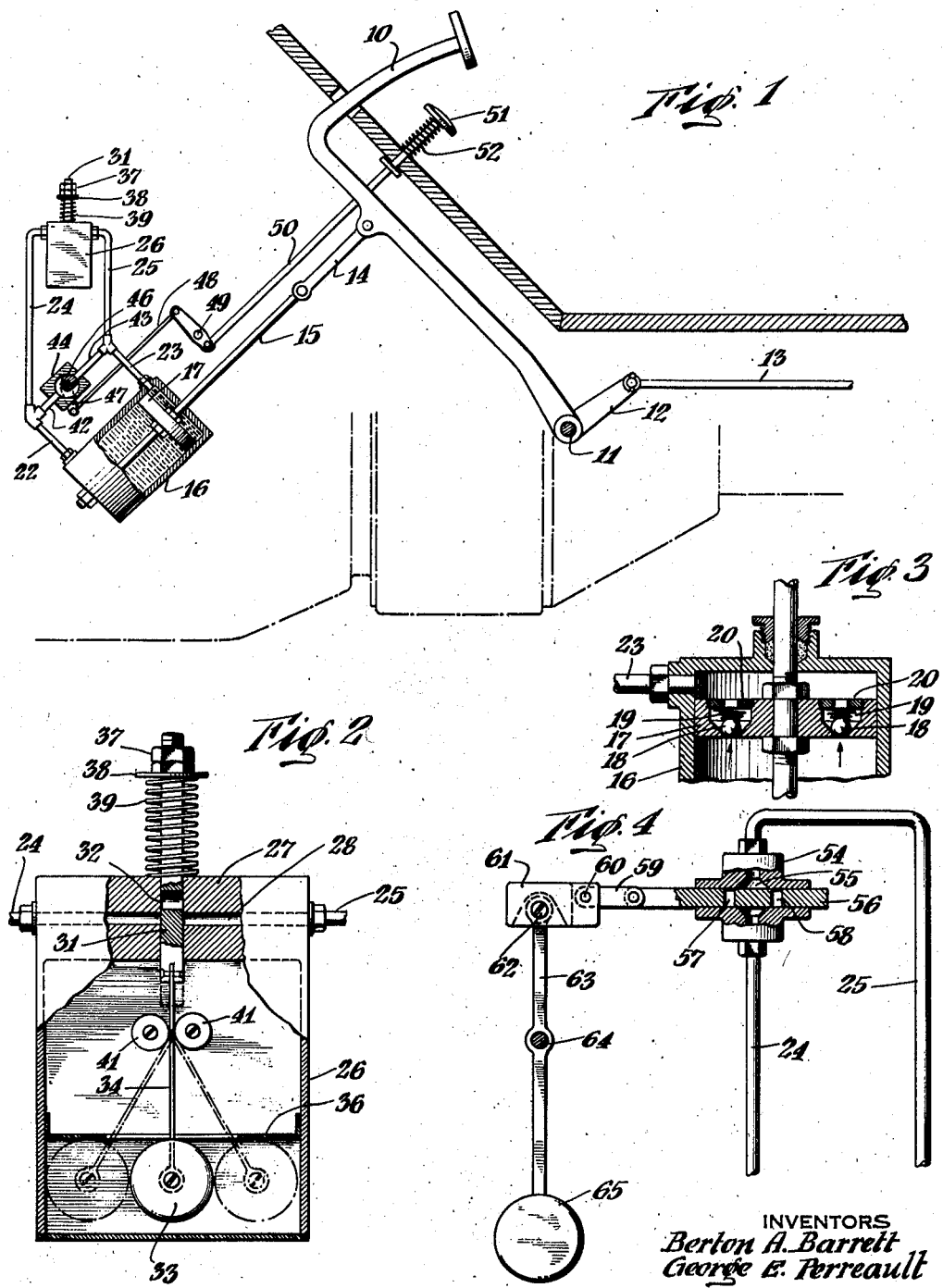

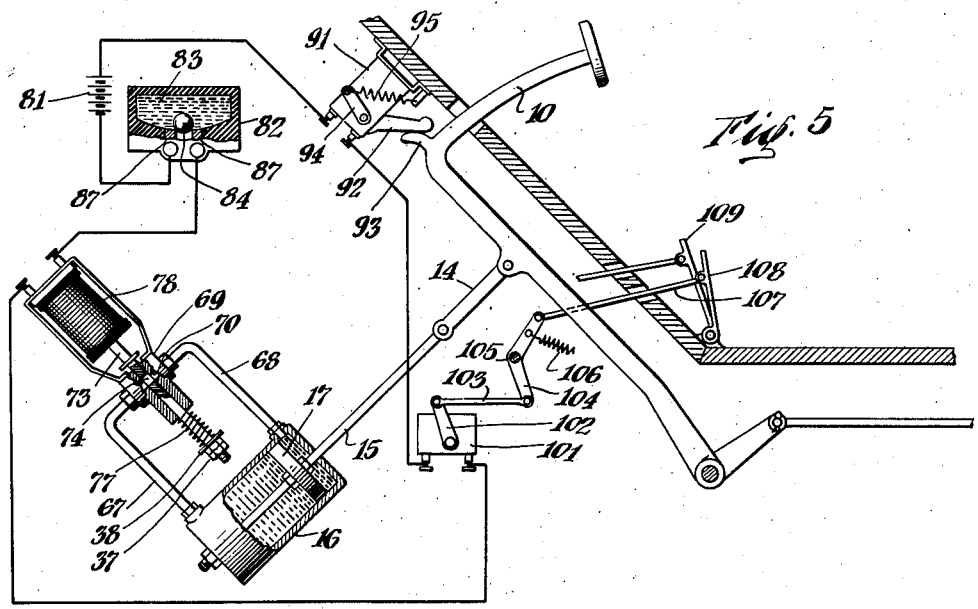

2,028,491

UNITED STATES PATENT OFFICE 2,028,491

BRAKE MECHANISM

Berton A. Barrett, Tuckahoe, and George E. Perreault, Bronxville, N. Y.

REISSUED

Application March 25, 1933, Serial No. 662,726

12 Claims. (Cl. 192—3)

This invention relates generally to brake systems, and has particular reference to improvements in brakes for automobiles. However, the invention is, as will be apparent later on, not limited to automobile use, as it can be employed in connection with other wheeled vehicles where it is desired to hold a set of brakes in braking or applied condition while the vehicle is at a stand-still.

One object of the invention is to provide an improved brake mechanism which will hold the brakes applied to prevent movement of the vehicle after the vehicle has been stopped. This is accomplished by using a feature which will act automatically, when the vehicle is brought to a stand-still with the brakes applied, to hold the brakes locked in braking position and thereby prevent movement of the vehicle. This makes it unnecessary for the operator to hold the brakes on by, for example, holding the brake pedal of an automobile down to prevent the automobile from moving.

Another object is to provide a mechanism having the advantages just pointed out, which is so constructed that there will be no interference with the use of the brakes to retard movement of the vehicle while the vehicle is moving.

Still another object is to provide a simple mechanism whereby the brakes may readily be released after they have been locked in braking position under control of the automatic feature above referred to. This release mechanism is preferably so arranged that it may be operated alone or as a preliminary incident to operation of the accelerator when the invention is used in an automobile.

With the foregoing and other objects and advantages in view, the invention consists in a novel construction and relation of parts, the novel features of which are pointed out in the appended claims, and embodiments of which are illustrated in the drawings which accompany and form a part of this application.

In said drawings:

Fig. 1 shows the invention in one form which it may have when applied to an automobile equipped with what are usually referred to as mechanical brakes;

Fig. 2 shows, partially in section, details of the form of inertia device employed in the construction illustrated in Fig. 1;

Fig. 3 shows in detail the form of one-way valves used in the brake control piston employed in the apparatus of Fig. 1;

Fig. 4 shows a modification of the inertia device shown in Fig. 2;

Fig. 5 illustrates another embodiment of the improvements in an automobile equipped with mechanical brakes;

Figs. 6 and 7 illustrate the invention applied to an automobile equipped with hydraulic brakes, and Fig. 8 is a sectional view through a one-way valve such as employed in the constructions illustrated in Figs. 6 and 7.

As previously stated, the apparatus shown in Fig. 1 includes the improvements in the form they would take when applied to an automobile equipped with mechanical brakes controlled by a foot pedal or lever 10. This lever is pivoted at 11 and is rigid with an arm 12 connected by a link or rod 13 to the brake applying mechanism. Pivoted to the lever 10 is a link 14 which is in turn pivoted to a rod 15 forming part of a piston working in a fluid containing cylinder 16. Secured on the rod 15 is the piston head 17. This head may be provided with any suitable form of a one-way valve mechanism. The construction employed in the apparatus of Fig. 1 includes a number of balls 18 (Fig. 3) each held against an opening through the piston head by springs 19 and a retaining nut 20. The construction is such that when the piston is thrust in one direction (downward in Fig. 1) the fluid in the cylinder can pass freely through the orifices in the piston head 17 and nuts 20, but the ball valves 18 will prevent a return flow through the piston head.

Communicating with the cylinder is a circulatory system for the fluid comprising pipes or tubes 22 and 23. These tubes are connected to pipes or tubes 24 and 25.

Mounted between the tubes 24 and 25 is an inertia controlled valve which is held open while the automobile is accelerating or decelerating and which automatically closes when the car comes to a stop, thereby closing or preventing circulation through the pipes 23, 25, 24, 22. When the brake lever 10 is operated and the piston 17 thrust downward in the cylinder 16 the piston is free to return if the inertia valve in the passageway is open. If, however, the automobile is brought to a stop the inertia valve is closed and the fluid which is trapped above the piston head 17 will hold the piston in the position to which it was moved by operation of the brake lever, resulting in the brakes being locked in braking or applied position.

The inertia controlled valve is shown in detail in Fig. 2. It comprises a casing 26 and a cross member 27 provided with a passageway 28 in communication with the tubes 24 and 25. The cross member 27 also is provided with a vertical passage in which a valve member 31 is supported for sliding movement. The member 31 has an opening or slot 32 which, when the automobile is accelerating or decelerating, is in alignment with the passageway 28 but which is moved out of alignment with the passageway when the automobile comes to a rest. The member 31 is moved in one direction by a ball or other suitable form of weight 33 suspended on a cord or flexible strip 34 secured to the lower end of the member 31. The weight 33 rolls along the underside of a cross plate 36 extending from side to side of the casing 26. The upper end of the member 31 is threaded and provided with suitable adjusting nuts 37 and a disk 38 for holding a spring 39 in position on the member. The spring 39 is of sufficient strength to raise the member 31 as the weight 33 approaches or comes to rest in the position shown in full lines in Fig. 2. Movements of the weight 33 and its suspending element 34 are controlled to a certain extent by the guide rollers 41.

When the car is standing still with the valve member 31 in the position shown in Fig. 2 operation of the brake lever 10 will cause the piston 17 to hold the brake lever in depressed position, but it is obvious that when the weight 33 moves toward either of the dotted line positions shown in Fig. 2 the member 31 will be drawn down to leave the circulatory system open for the fluid to flow in either direction. These dotted line positions represent the limits of the movements of the weight 33 and the connected parts when the automobile is moving, particularly when it is accelerating and de-celerating. During such movements the valve 31 is open and the brakes may be used without any interference by the inertia controlled device.

In order to permit freeing the brakes when the car has been stopped with the brakes applied, a by-pass is provided containing a valve which is normally closed but which can be opened to allow a return flow of the fluid in the cylinder 16 and thereby allow the brake lever and connected parts to return to their normal or brakes-off position. This by-pass and valve mechanism includes pipes or tubes 42 and 43 communicating with a chamber in a valve casing 44. Rotatable in this casing is a valve member 46 rigid with a crank arm 47 connected to one end of a link 48 which is pivoted to one end of a lever, pivoted at 49, that lever in turn being pivoted to a rod 50 passing through the floor board of the automobile and terminating in a button or knob 51. Pressure on the knob will swing the valve member 46 to a position where communication will be established through the tubes 42 and 43 so that fluid trapped above the piston 17 may circulate through the valve and enter the cylinder below the piston thereby allowing the piston to return to its normal position and permitting a like return of the brake lever and connected parts. A spring 52 on the rod 50 normally holds the valve 46 closed. The button or knob 51 is preferably placed adjacent to the accelerator and preferably arranged to project above the accelerator. This permits operating the valve 46 alone to release the brakes or the knob 51 may be depressed in advance of the accelerator because of the fact that the knob extends above the accelerator. This arrangement, while not shown in Fig. 1, is illustrated in another form in Figs. 5, 6, and 7.

Fig. 4 shows a modification of the inertia valve 26 shown in Figs. 1 and 2. It comprises a valve casing 54 connected to the pipes 24 and 25 and containing a valve chamber 55. Sliding through a suitable opening in the valve casing is a member 56 provided with two openings 57 and 58. The member 56 is pivotally connected at one end to a link 59 which in turn is pivoted at 60 to a member 61. This member is pivotally connected at 62 to the upper end of a lever 63 pivoted at 64 and carrying at its lower end a weight 65. In Fig. 4 the parts are all shown in the position they assume when the automobile is standing still. When the car is moving, and particularly when it is being accelerated or de-celerated, the weight 65 will, because of its inertia or momentum, cause either of the openings 57 or 58 to be brought into communication with the valve chamber 55 and thereby permit circulation of the fluid from the cylinder. When the car comes to a stop with the brakes applied the parts will again assume the position shown in Fig. 4, thereby closing the valve and trapping the fluid above the piston 17 and holding the brakes locked.

In Fig. 5 the improvements are shown in another form which they might take when applied to an automobile equipped with mechanical brakes. In this form, a different kind of an inertia device is used to control a by-pass valve by means of an electric circuit including one or more switches. The brake lever 10, link 14, piston rod 15, cylinder 16, and piston head 17 are constructed and operated in the same way as previously described in connection with the apparatus of Fig. 1. The circulatory system shown in Fig. 5 comprises tubes 67 and 68 connected to the cylinder 16 above and below the piston head 17, and a valve casing 69 containing a passage 70 in communication with the passages through the tubes. Sliding in the valve casing 69 is a valve member 73, containing an opening or slot 74, and carrying at its lower end a return spring 77 and the same nut and disk arrangement as previously described. The upper end of the valve member or rod 73 extends into a solenoid coil 78 and is movable in one direction by the solenoid and in the other by the spring 77. Normally, the valve member 73 is in a position where its passageway 74 is in alignment with the passageway through the valve casing 50 but when the brakes are applied, and the car comes to a stop, the solenoid operates to shift the valve member upward to cut off the return flow of fluid from the cylinder 16.

The current for the solenoid is supplied by a battery 81 or other suitable source of supply, through a circuit which includes an inertia valve and one or more switches. The inertia device referred to comprises a casing 82 enclosing a chamber 83 filled with a light oil or other suitable fluid. The casing is made of a non-conducting material and the chamber in it is so formed as to provide a curved bottom forming a track for a ball 84 which, when the automobile is at rest, makes a connection between two contacts 87. These contacts are connected by wires to the electric circuit. When the automobile is moving and particularly when accelerating and de-celerating the ball 84 will, because of its inertia or momentum, be held away from the contact points 87, thereby causing the circuit through the solenoid to be open so far as the contact or connection is concerned.

The curved surface upon which the ball 84 moves is of such a radius as to make it certain that the ball will roll to the circuit making position on any grades likely to be encountered. It is very seldom that road surfaces exceed a 10% grade and the curved surface referred to will have its surface inclined in excess of the 10% grade mentioned so that for any common grade there will be an effective inclination causing the ball to roll to the contact position.

The electric circuit may also include a switch designated generally as 91. It may be of any suitable construction and includes an arm 92 resting upon an extension 93 on the brake lever. An arm 94 is rigid with and movable with the arm 92 and is connected by a spring 95 to an adjacent stationary part. This switch is not essential although it serves a valuable purpose in preventing drain on the source of current supply.

When the brake lever 10 is operated to throw on the brakes the spring 95 will throw the switch to close the circuit at that point. Then when the ball or roller 84 comes to rest between the contacts 87 it will establish the circuit through the inertia device 82 and the solenoid 78 will operate the valve member 73 to shut off the circulatory system and trap the fluid in the cylinder 16 above the piston 17 to lock the brakes in applied position.

To release the brakes a second switch 101 is employed. This switch may be of any desired construction and comprises an arm 102 connected by a link 103 to the lower end of a lever 104 which is pivoted at 105 and is equipped with a return spring 106. The upper end of the lever 104 is connected by a link 107 to a pedal 108 which is preferably adjacent to the throttle or accelerator pedal 109. The arrangement is such that the pedal 108 may be operated alone to throw the switch 101 and thereby release the brakes, or the pedal may, on account of its being set ahead of the accelerator pedal 109, be operated first or as a preliminary incident to operating the accelerator pedal.

The apparatus in Fig. 6 is adapted for application to automobiles equipped with hydraulic brakes. It includes a fluid containing cylinder 116 and a piston head 117 connected by a rod 118 and a link 119 to the brake lever 10. The piston head is not perforated or equipped with one way valves such as shown in Fig. 3, but expels the fluid to operate the brakes when the brake lever 10 is operated. Connected to the cylinder 116 are tubes 120 and 121 having their passages communicating with a chamber in a valve casing 122. In this chamber is mounted a one-way ball valve which is shown in Fig. 8 in such detail as to require no further description. The tube 121 communicates with a tube 123 for transmitting the brake operating fluid to the brake mechanism. A loop 124 of the tubing transmits the fluid through an inertia controlled valve which is designated 126 and is the same as the one shown in detail in Fig. 2. A section 125 of tube connects the loop 124 with the tube 123. When the fluid is expelled from the cylinder 116 it is forced through the one way valve 122 and may circulate through the inertia control valve if the automobile is in motion and particularly when the automobile is being accelerated or de-celerated. The one way valve 122 prevents the return of the fluid from the brake tube 123 and when the automobile comes to a stop the inertia control valve 126 will be closed and as a result the fluid expelled from the cylinder will be trapped, thereby causing the brakes applied by movement of the lever 10 to be locked in braking position.

To release the brakes, connections including a valve 127 afford means for letting the braking fluid return to the cylinder while the inertia valve 126 remains closed. The valve 127 is similar to the valve 44 previously described and has its operating arm 128 connected by a link 129, pivoted lever 130 and link 131 to a pedal 132. This pedal is placed like the pedal 108 previously referred to and may also be operated singly to release the brakes or as a preliminary incident to operating the accelerator.

In the embodiment illustrated in Fig. 7 the electric circuit and ball form of inertia device previously described are applied to a hydraulic brake system. The one-way valve 122 previously described is employed and the inertia device controls a solenoid operated valve 134 like the one previously described when referring to Fig. 5. In the operation of the apparatus of Fig. 7 the liquid expelled from the brake operating cylinder 116 is trapped by the one-way valve 122 and by the solenoid operated valve 134 when the automobile comes to a stop. This is because the ball 84 will close the circuit when the movement of the vehicle has substantially ceased, thereby causing the solenoid valve to close the circulatory system against return to the brake fluid. To release the brakes, the circuit is broken by operating a pedal 108 to throw a switch 101 in the manner previously described when explaining the mechanism of Fig. 5.

The inertia devices are so constructed and adjusted that they will perform their functions when the vehicle is brought to a stop on an incline, or when the vehicle is travelling in either direction and brought to a stop, as, for instance, when backing an automobile and applying the brakes. This is one reason for the curved bottom or track for the balls 84 in the electrical equipment. The construction of the curved bottom or track to ensure causing the ball to make contact on different grades, has already been pointed out.

In explaining the invention, the novel construction and the relations of the parts shown in the drawings have been set forth in detail, but it is not the desire to be limited by the drawings or explanation in any way except as specified in the following claims.

What is claimed is:

1. A vehicle brake system comprising means under the control of the operator for applying and releasing the brakes, means automatically rendered effective by bringing the vehicle to a stop for holding the brakes applied, and means under the control of the operator for disabling said holding means at will.

2. A vehicle brake system comprising means under the control of the operator for applying and releasing the brakes, means automatically rendered effective by stopping the vehicle for holding the brakes applied, an accelerator mechanism comprising a member movable by the operator to control the engine speed, and a device comprising a member movable by the operator to render the aforesaid holding means ineffective preliminary to movement of the accelerator operating member.

3. A vehicle brake system comprising an operating member movable by the operator to apply the brakes, an inertia device, a device connected to the operating member and controlled by the inertia device for holding the brakes applied when the vehicle is brought to a stop, and a device whereby the operator may disable the holding device and release the brakes at will.

4. A vehicle brake system comprising an operating member movable by the operator to apply the brakes to stop the vehicle, an inertia device, means controlled by the operating member and rendered effective by the inertia device when the vehicle is brought to a stop for holding the brakes applied, and means under the control of the operator for rendering the inertia device ineffective and releasing the brakes preparatory to starting the vehicle.

5. A vehicle brake system comprising a lever operable to apply the brakes, an inertia device, mechanism controlled by the inertia device for holding the lever in brake applied position as soon as the vehicle comes to a stop, and means whereby the operator may render said mechanism ineffective before starting the vehicle.

6. A vehicle brake system comprising an operating member movable by the operator to apply the brakes to stop the vehicle, an inertia device, means controlled jointly by the operating member and the inertia device for holding the brakes applied when the vehicle has been brought to a stop, and a device under the control of the operator for rendering the holding means ineffective while the car is at a standstill.

7. A vehicle brake mechanism comprising an operating member for applying the brakes, a piston connected to the operating member and a fluid containing cylinder in which the piston reciprocates, one-way valves in the piston, a circulatory system connected to the cylinder, an inertia device, a valve controlled by the inertia device for closing the system and thereby holding the piston in the position to which it is moved by the operating member when applying the brakes, and a device under the control of the operator for releasing the piston to free the brakes when desired.

8. A vehicle brake system comprising an operating member movable by the operator to apply the brakes, an inertia device, mechanism comprising a valve controlled by the inertia device for holding the brakes applied when the vehicle is brought to a stop, a second valve operable to release the brakes, and connections operable by the operator for opening said second valve to release the brakes.

9. In an apparatus of the character described, a brake operating lever, a piston connected to said lever and provided with a one-way valve mechanism, a fluid containing cylinder in which the piston is confined for reciprocatory movement, an inertia device, a circulatory system connected to the cylinder, a valve in the circulatory system controlled by the inertia device for preventing the fluid from entering the cylinder and thereby holding the piston in the position to which it is moved by the aforesaid lever when said lever is moved to apply the brakes, and an auxiliary device for admitting fluid to the cylinder to release the brakes.

10. A vehicle brake system comprising devices for applying the brakes comprising an operating lever, an engine accelerator mechanism comprising a member movable by the operator, an inertia device, means controlled by the inertia device when the vehicle comes to a stop for holding the aforesaid operating lever in the brake applied position, and means operable in advance of and as an incident to operation of the accelerator for disabling the brake holding devices when starting forward movement of the vehicle.

11. An automobile brake mechanism comprising a lever for operating the brakes, an engine accelerator mechanism comprising a manually operable member, an inertia device, means rendered effective by the inertia device when the automobile comes to a stop for holding the brake operating lever in brake applying position and with the brakes applied, and a brake releasing device comprising a member adjacent to the accelerator operating member and operable singly or in combination with the accelerator member.

12. A vehicle brake system comprising means under the control of the operator for applying and releasing the brakes, means comprising a circulatory system normally open while the vehicle is moving, and an inertia device for closing the circulatory system to hold the brakes applied, said inertia means being rendered effective by bringing the vehicle to a stop, and a device under the control of the operator for rendering said means ineffective at will.

BERTON A. BARRETT.
GEORGE E. PERREAULT.